(12) United States Patent
Dickau

(10) Patent No.: US 6,951,099 B2
(45) Date of Patent: Oct. 4, 2005

(54) HEATED INSULATED CATALYTIC CONVERTER WITH AIR COOLING

(76) Inventor: John Dickau, 10515-52 Street, Edmonton, Alberta (CA), T6A 2G7

(*) Notice: Subject to any disclaimer, the term of this patent is extended or adjusted under 35 U.S.C. 154(b) by 76 days.

(21) Appl. No.: 10/063,060

(22) Filed: Mar. 15, 2002

(65) Prior Publication Data
US 2002/0139114 A1 Oct. 3, 2002

Related U.S. Application Data

(60) Provisional application No. 60/280,855, filed on Apr. 3, 2001.

(51) Int. Cl.$^7$ .............................................. F01N 3/10
(52) U.S. Cl. .............................. 60/300; 60/275; 60/292; 60/298; 60/303; 60/324; 422/174; 422/186.15; 422/186.19
(58) Field of Search .................. 60/299, 300, 275, 60/289, 292, 293, 298, 303, 320, 321, 324; 422/174, 186.11, 186.19, 186.15, 186.22

(56) References Cited

U.S. PATENT DOCUMENTS

| | | | |
|---|---|---|---|
| 3,665,711 A | 5/1972 | Muroki | |
| 3,747,346 A | 7/1973 | Onoda et al. | |
| 3,768,982 A | 10/1973 | Kitzner et al. | |
| 3,820,327 A * | 6/1974 | Henault | 60/286 |
| 3,910,042 A | 10/1975 | Yuge et al. | |
| 3,911,675 A | 10/1975 | Mondt | |
| 3,947,544 A | 3/1976 | Yamada et al. | |
| 3,967,929 A * | 7/1976 | Tamazawa et al. | 60/286 |
| 4,345,430 A | 8/1982 | Pallo et al. | |
| 4,474,345 A | 10/1984 | Musgrove | |
| 4,976,929 A | 12/1990 | Cornelison et al. | |
| 5,065,574 A * | 11/1991 | Bailey | 60/274 |
| 5,092,122 A | 3/1992 | Bainbridge | |
| 5,155,995 A | 10/1992 | Kinnear | |
| 5,163,289 A | 11/1992 | Bainbridge | |
| 5,209,428 A | 5/1993 | Bebilaqua et al. | |
| 5,293,743 A * | 3/1994 | Usleman et al. | 60/299 |
| 5,319,929 A | 6/1994 | Cornelison et al. | |
| 5,325,038 A * | 6/1994 | Banzai et al. | 320/135 |
| 5,331,810 A | 7/1994 | Ingermann et al. | |
| 5,388,404 A | 2/1995 | Tsumura et al. | |
| 5,419,127 A | 5/1995 | Moore | |
| 5,477,676 A * | 12/1995 | Benson et al. | 60/274 |
| 5,497,617 A | 3/1996 | Bagley et al. | |
| 5,537,321 A | 7/1996 | Yoshizaki et al. | |
| 5,555,725 A * | 9/1996 | Shimasaki et al. | 60/277 |
| 5,580,477 A | 12/1996 | Oota et al. | |
| 5,746,051 A * | 5/1998 | Kieser et al. | 60/275 |
| 5,845,486 A | 12/1998 | Yamashita et al. | |
| 5,904,042 A * | 5/1999 | Rohrbaugh | 60/298 |
| 5,983,628 A | 11/1999 | Borroni-Bird et al. | |
| 5,987,885 A | 11/1999 | Kizer et al. | |
| 6,116,022 A * | 9/2000 | Woodward | 60/300 |
| 6,128,898 A * | 10/2000 | Sakurai et al. | 60/277 |
| 6,203,764 B1 * | 3/2001 | Benson | 422/179 |
| 6,233,926 B1 * | 5/2001 | Bailey et al. | 60/295 |

* cited by examiner

Primary Examiner—Binh Q. Tran

(57) ABSTRACT

A heated and insulated catalytic converter includes a heat storage device and a control system for maintaining an elevated temperature while the engine is not operating. The control system may also include control of flaps to allow cool air to circulate to prevent overheating and timers.

27 Claims, 7 Drawing Sheets

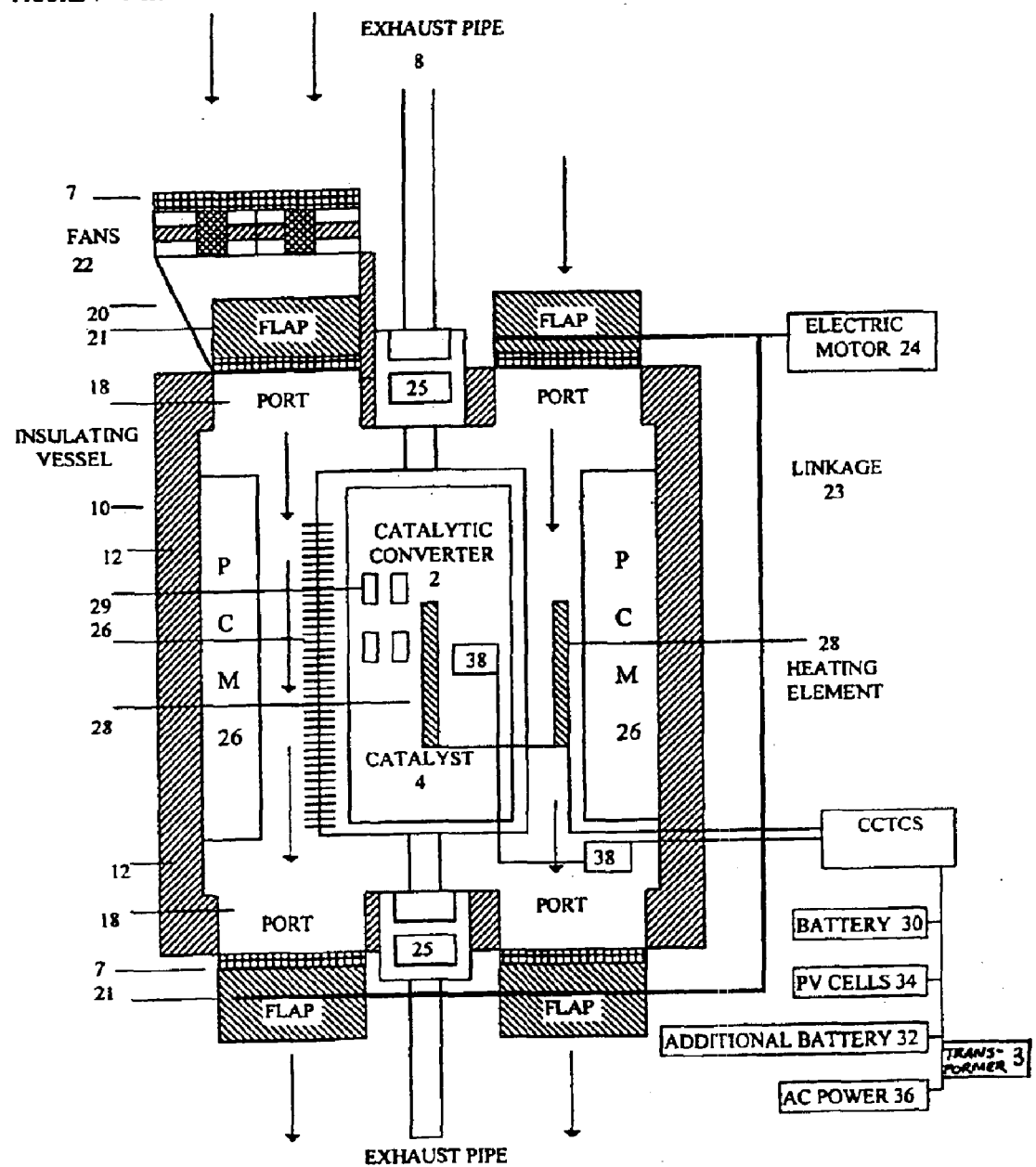
FIGURE 1 Cross section of the insulating vessel and catalytic converter.

FIGURE 2 Cross section of the insulating vessel and catalytic converter
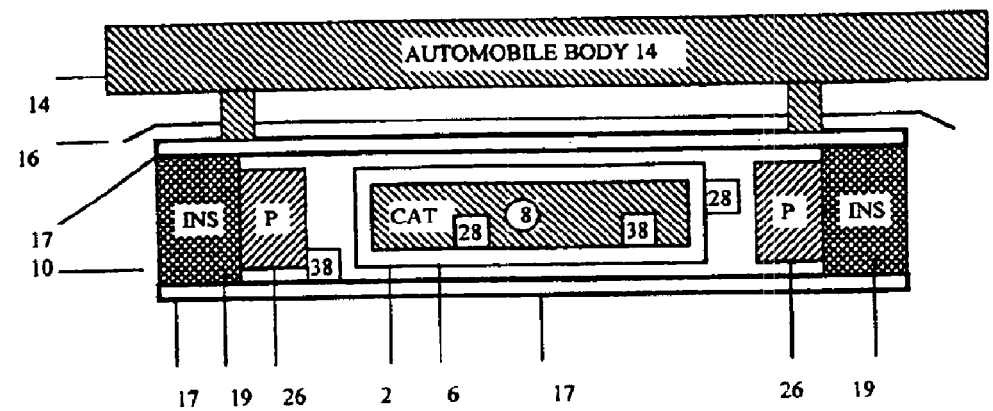
FIGURE 3 Frontal view of the insulating vessel
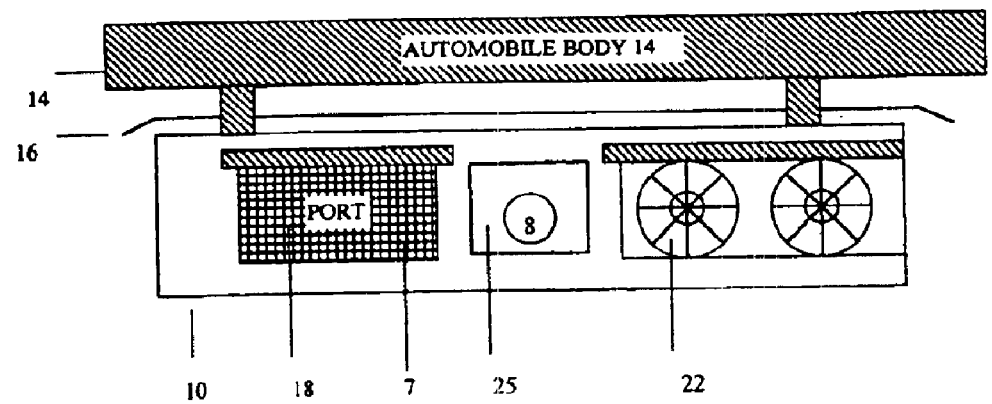
FIGURE 4 Insulating material configurations
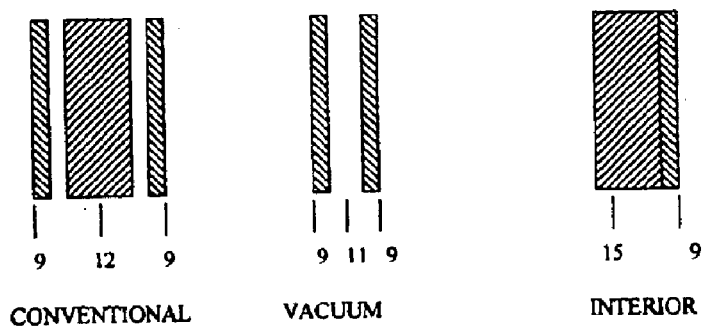
CONVENTIONAL    VACUUM    INTERIOR FIGURE 5 Cross section of insulating vessel and catalytic converter
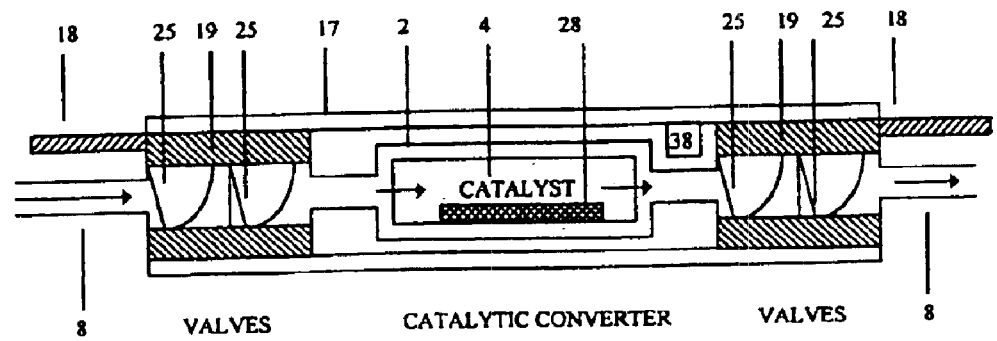
FIGURE 6 Side view of the insulating vessel showing open port flaps
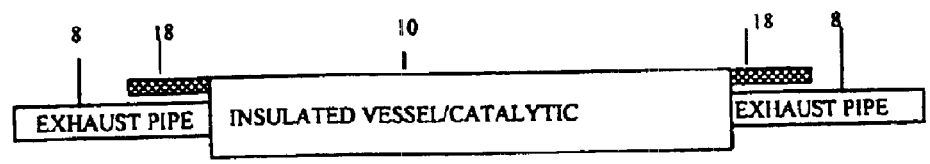
FIGURE 7 Side view of the insulating vessel showing closed port flaps
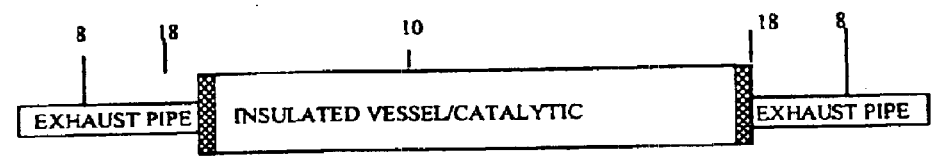
FIGURE 8 Side view of insulating vessel showing fan and air scoop
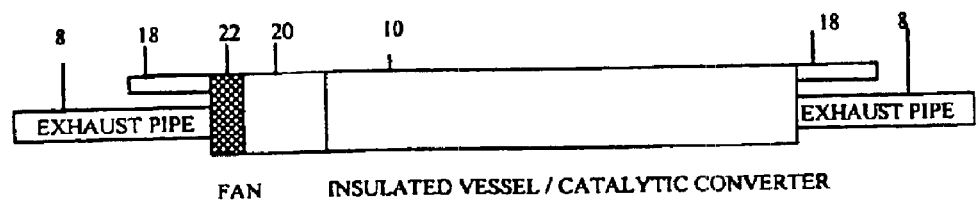

FIGURE 9 Cross section of valves on the exhaust pipe showing open and closed positions of flaps.
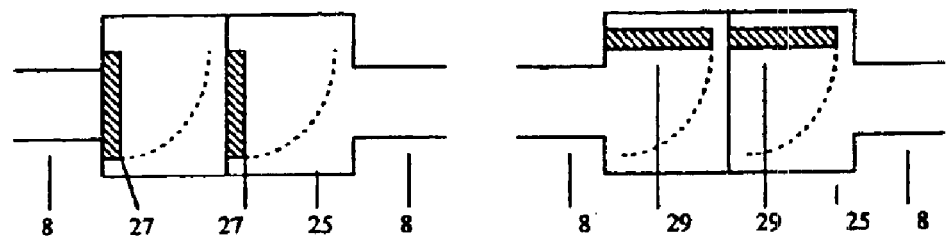
FIGURE 10 Diagram of temperature control of the CCTCS
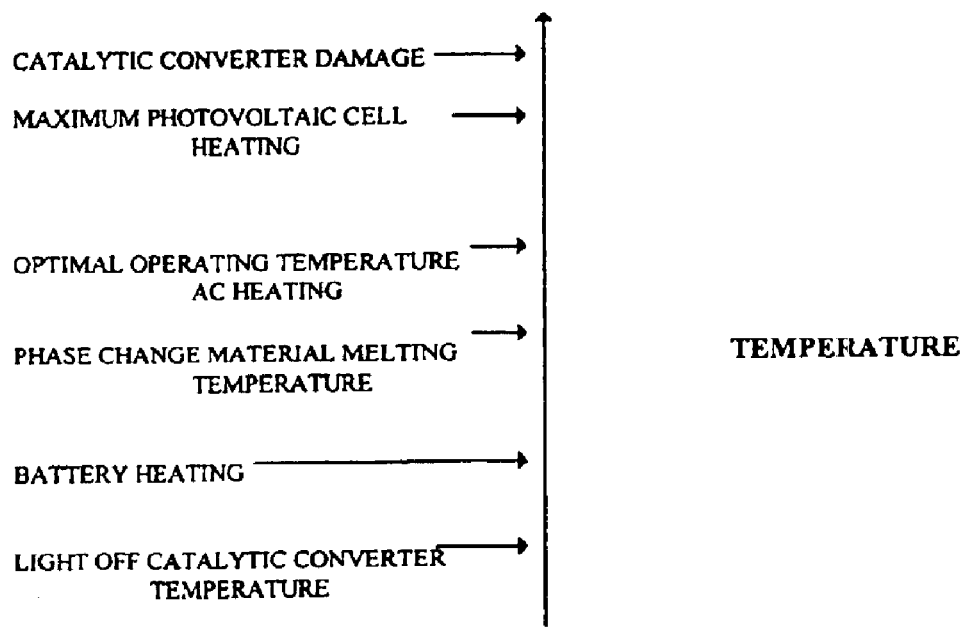

FIGURE 11 Cross sectional view of the insulating vessel showing various locations of the PCM containers.
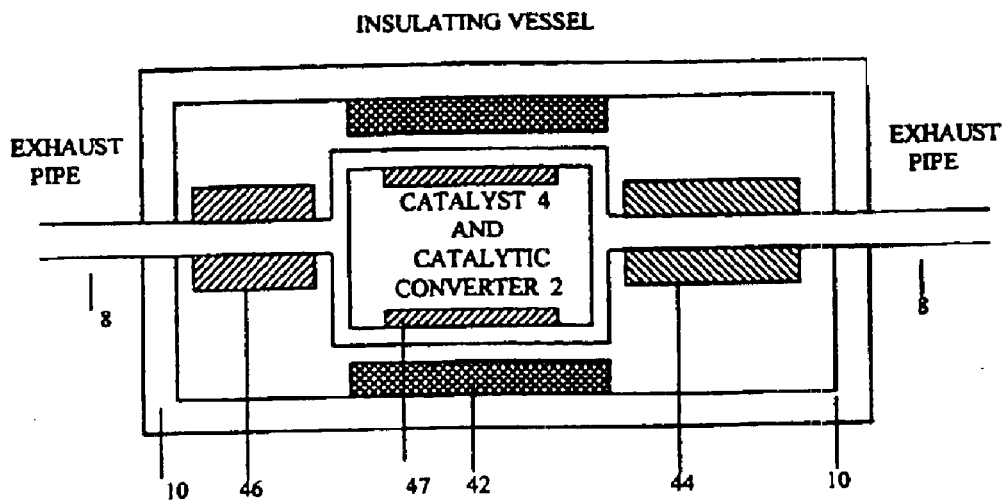
FIGURE 12 Schematic diagram of a fuel heating system that passes combustion products into the exhaust pipe.
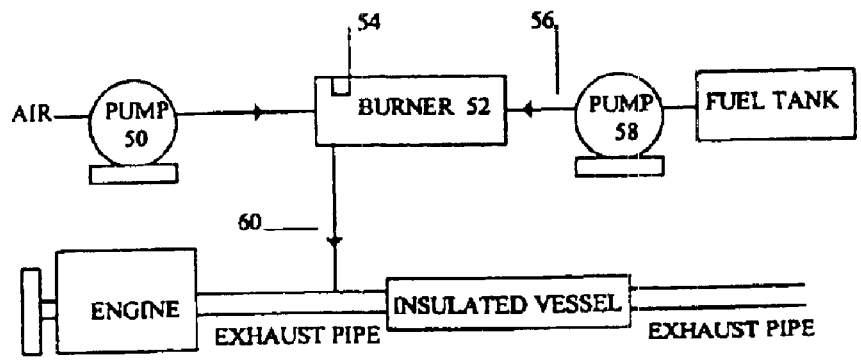

FIGURE 13 Schematic diagram of a fuel heating system that passes combustion products into the insulate vessel, showing partially open port flaps.
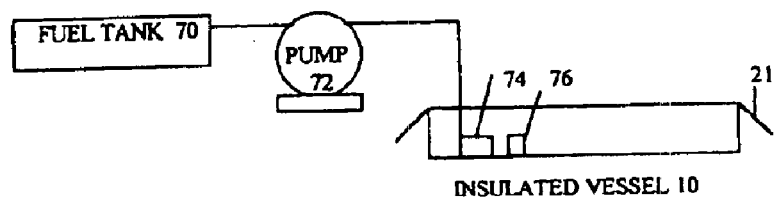
FIGURE 14 Schematic cross sectional view of a exhaust pipe temperature control system.
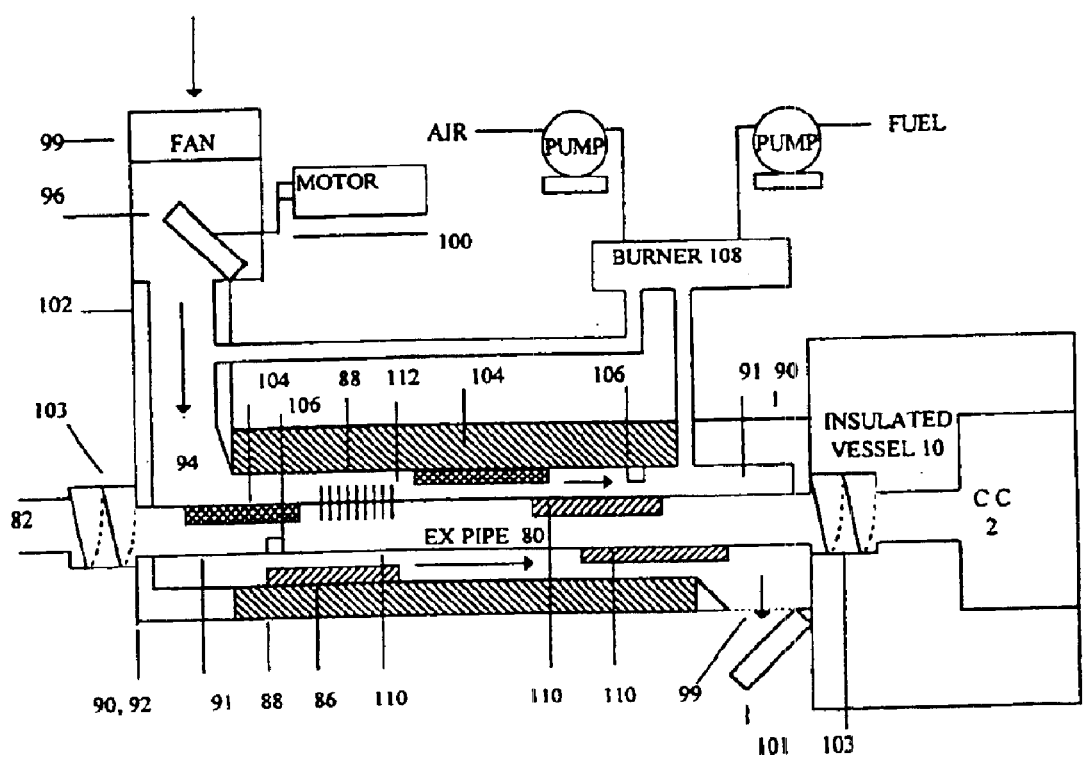

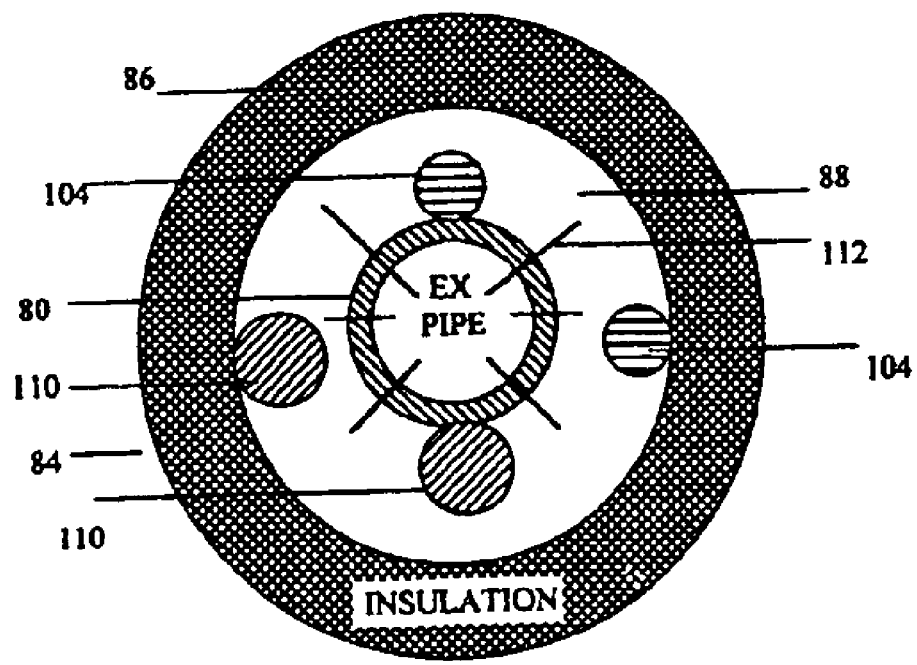
FIGURE 15 Cross section of the insulating pipe and exhaust pipe.

HEATED INSULATED CATALYTIC CONVERTER WITH AIR COOLING

CROSS REFERENCE TO RELATED APPLICATIONS

This application claims the priority benefit of U.S. Provisional Application No. 60/280,855 filed on Apr. 3, 2001.

BACKGROUND OF INVENTION

The present invention relates to catalytic converters and in particular, to insulated catalytic converters having heating means, temperature control means and heat storage means.

When a cold internal combustion engine with a catalytic converter is started, the emission of pollutants is high, as the catalyst within the catalytic converter does not function at low temperatures. The exhaust emitted at start up heats the exhaust manifold and the exhaust pipe before heating the catalytic converter. It takes several minutes for the cold catalytic converter to be heated to "light off" temperature. The "light off" temperature is the temperature at which the catalytic converter oxidizes at least fifty percent of hydrocarbons in engine exhaust. It has been reported that 60 to 80 percent of all hydrocarbon emissions occur during the first few minutes after engine startup. To reduce the emission of pollutants at startup efforts have been directed at:

maintaining the catalytic converter at a functional temperature using fuel combustion, preheating the catalytic converter, rapidly heating the catalytic converter after startup using electrical heating, or a increased fuel air ratio, and storing pollutants, in zeolites, until the catalytic converter has reached a functional temperature.

Efforts have also been made to control catalytic converter temperature during engine operation. Aspects of the technology for controlling catalytic converter temperature during engine operation are related to aspects of maintaining the catalytic converter at functional temperatures between engine uses.

1. Catalytic Converter Insulation and Air Flow Control Systems

Benson et al. in U.S. Pat. No. 5,477,676, dated Dec. 26, 1995, describes a catalytic converter surrounded by a variable conductance insulation for maintaining the operating temperature of the catalytic converter at a optimal temperature. The insulation "inhibits heat loss when raising the catalytic converter temperature to light off temperature". The variable conductance insulation includes vacuum gas control and metal-to-metal thermal shunt mechanisms. This variable insulation is used to reduce the problem of overheating the catalyst which can lead to accelerated aging of the catalyst or even permanent damage to the catalytic converter. The variable conductance insulation system proposed is conceptually and mechanically complex, requiring numerous mechanical components and a complex manufacturing, assembly and installation.

Bainbridge in U.S. Pat. No. 5,163,289, dated Nov. 17, 1992, and in U.S. Pat. No. 5,092,122, dated Mar. 3, 1992, discloses a "insulation jacket around the exhaust pipe which is composed of fibers that conduct heat better at higher temperatures than at lower temperatures, and "allowing the exhaust pipe to reach the light off temperature of the catalytic converter in a short time". The function of this refractory fiber insulation is based on fiber density and on the thickness of the blanket of fibers. The insulating refractory fibers are contained in a double walled flexible tube that is slid over a existing exhaust pipe. The walls of the flexible tube are made of corrugated stainless steel tubes.

Ingermann et al. in U.S. Pat. No. 5,331,810, dated Jul. 26, 1994, teaches an exhaust pipe with a low thermal capacitance inner pipe and a outer heavy gauge pipe. The thin pipe is supported in the center of the outer pipe such that an insulating air space exists between the two pipes. The outer pipe is not insulated. No effort is made to control air movements within the enclosed insulating air space. From this "the thin walled pipe", "causes the heat energy in the combustion product's to reach the exhaust processor in a short period of time during the start up of a cold engine". The problem of overheating of the catalytic converter, during extended engine operation, caused by insulating the exhaust pipe is not dealt with.

Rohrbaugh in U.S. Pat. No. 5,904,042 dated May 18, 1999, discloses "a diesel exhaust system that reduces harmful gases and particulate pollutants", the system "includes at least one combination catalytic converter and particulate filter". Rohrbaugh states "the catalytic converter is contained in a insulated canister which itself is contained in a shroud, for containing the heat generated by catalytic reactions. The insulation also serves to lower the outside temperature of the canister". An axial fan blows air between the canister and shroud to reduce the exterior temperature of the shroud to a acceptable level. However, air flow is directed through the canister and not the catalytic converter. The purpose of the air flow is to cool the shroud while maintaining the heat of the catalytic converter.

Kizer and Borroni-Bird in U.S. Pat. No. 5,987,885 dated Nov. 23, 1999, and in U.S. Pat. No. 5,983,628 dated Nov. 16, 1999, describes a fan blown cooling system for blowing air around tubes which are part of a combination catalytic converter and heat exchanger unit. The heat exchanger "unit includes a plurality of spaced apart tubes" the "tubes include a substrate on which is formed a catalyst that reduces or eliminates harmful by products". The speed of the fan is controlled variably to adjust the temperature of exhaust emissions in response to various output data", "two or more catalysts that have different operating ranges" can be used. The tubes may be electrically heated to extend the duration whereby the catalytic converter is operating within its efficient conversion window.

Yamada et al. in U.S. Pat. No. 3,947,544 dated Mar. 30, 1976 describes an exhaust pipe upstream of the catalyst provided with a double wall conduit. Secondary air is continuously passed through the outer conduit and selectively directed into the catalyst bed or vented to the atmosphere depending upon temperature conditions in the catalyst bed. The primary objective of Yamada and Kitamura is "avoiding over heating and thermal destruction of the catalyst bed" while insulating the exhaust pipe upstream of the catalytic converter.

Yuge et al. in U.S. Pat. No. 3,910,042 dated Oct. 7, 1975, describe using a "blower to be driven so that air is forced into and flows through the second group of passages", a heat exchanger within a catalytic converter, to thereby prevent the catalyst from being melted. Also disclosed is a heat source such that the air supplied to the bed is heated to heat the bed to a temperature at which the catalyst is appropriately activated. A forced air circulation through a combined catalytic converter heat exchanger is used to control catalytic converter temperature. However, heating of air electrically, then passing the air through the catalytic converter is inefficient and results in a loss of energy. More energy is required to heat the increased mass of a catalytic converter combined with a heat exchanger. This increased energy requirement slows the temperature increase of the catalytic converter at start up leading to higher emissions. This comment also applies to the exhaust pipe heat exchanger and the catalytic converter heat exchanger described by Kizer et al.

Kinnear et al. in U.S. Pat. No. 5,155,995 dated Oct. 20, 1992, describes an electrically energized heater in association with a catalytic converter. Kinnear et al. also describes pre-heating which is triggered by a mobile transmitter and a "functional verification device". Also described is a catalytic converter which is a unit comprising a outer casing which surrounds, but is spaced from, an inner canister. The gap forms a thermal barrier and can be filled with a thermal resistant or insulating material such as asbestos or glass fiber. No solution is given for the problem of catalytic converter over heating and loss of function that results when a catalytic converter is insulated Onoda et al. in U.S. Pat. No. 3,747,346 dated Jul. 24, 1973 describes a "encasing structure disposed about the exhaust pipe upstream of the catalytic converter and spaced from the exhaust pipe. This gap functions to prevent heat loss from the exhaust pipe and which permits the air to pass there through to prevent an excessive high temperature of the exhaust pipe". Further "the walls of the encasing structure may be insulated with fibers or foam insulation, if desired". Also "the encasing structure has an air inlet passage found at its upstream side and air outlet passage found at its downstream side". The air inlet and outlet have "mechanically connected", "valves". These valves are controlled by a system receiving information from a temperature sensor that "detects the temperature of the catalyst". This air flow control system reduces heat losses from the exhaust pipe heating the catalytic converter more rapidly to a operating temperature at startup. By allowing increased air flow around the exhaust pipe during engine operation the risk of over heating the catalytic converter is reduced.

Yamashita et al. in U.S. Pat. No. 5,845,486 dated Dec. 8, 1998, discloses an exhaust damper for opening and closing an exhaust pipe which is disposed downstream of a catalyst. The closed exhaust damper keeps the warmth of the catalyst. The invention described here has insulated flaps that open in the direction of the exhaust stream. There are two flaps in tandem in front of, and behind, the catalytic converter. The space between the two flaps being a air insulating space. The flaps are made of either a low thermal conductance ceramic, or thin vacuum panels. The flow of exhaust from the engine moves the flaps to a horizontal position opening the exhaust pipe. When the engine is turned off the flaps move to a vertical position where they block air movement in the exhaust pipe.

2. Heating of the Catalytic Converter

There are many prior art disclosures of electrically heated catalytic converters. None, however, adequately deal with the large amount of power needed to heat a converter to its light off temperature from ambient temperature and the problem of overheating if the converter is insulated. As well, electrical heating can heat catalytic converters too rapidly which may damage the catalyst. Rapid heating will cause natural deterioration of the catalyst over time.

Tandem catalytic converter inventions are also known and usually have a small catalytic converter positioned near the engine so that they are heated more rapidly than the main catalytic converter, which is positioned well away from the engine to prevent overheating, as is conventional practice. Tandem catalytic converter systems protect the main catalytic converter from over heating. The small catalytic converter near the engine is subjected to rapid heating and temperatures which can result in damage and loss of catalytic converter function. The strategy of tandem catalytic converter proposals appears to be to sacrifice the small catalytic converter at regular invervals. The servicing costs, and time loss related to the vehicle being in for service likely exceed the cost to the consumer of replacing the main catalytic converter. The degradation of the small catalytic converter is the general problem associated with tandem catalytic converter proposals.

Inventions using side-by-side catalytic converters have a small catalytic converter next to a large main catalytic converter. The small catalytic converter receives the exhaust at engine start-up and is rapidly heated to a operational temperature. After a initial period the exhaust is diverted to the main catalytic converter. Side-by-side catalytic converters do not reduce emissions. The main catalytic converter still has to be heated to a operating temperature by the passage of exhaust through it. While the small and main catalytic converters are being heated the exhaust is not treated and pollution emissions are high. Proposals based on a side by side catalytic converter system may reduce the level of pollutants emitted during the initial period, but extend cold start emissions over a longer time period. Since two exhaust pipes need to be heated the emissions of side by side catalytic converter proposals may actually be higher than if a a small catalytic converter were not used.

3. Fuel Combustion Heating

Mondt in U.S. Pat. No. 3,911,675 dated Oct. 14, 1975, describes "a converter heating system to maintain the catalytic converter at a predetermined temperature so that it is effective upon engine start-up to diminish products of combustion. The converter heating system includes in combination a small pump which draws a air fuel mixture from the fuel tank, a igniter and a pilot burner". Mondt states "the present invention provides continuous heating means which maintain the catalytic bed temperature" and "includes a pilot burner for heating". The invention of Mondt has a "housing formed preferably of a high chromium stainless steel", no mention is made of the use of insulation to reduce heating requirements. Fuel burning systems require many parts which can break down, and safety concerns exist regarding having a combustion process operating without supervision. A fuel burning system cannot operate when a vehicle is parked within an enclosed area, a problem not addressed by Mondt.

SUMMARY OF INVENTION

This invention concerns heating a catalytic converter (CC) and, alternatively, an exhaust pipe (EP) of a internal combustion engine between uses using electricity, or fuel combustion. To reduce heating requirements the CC and the EP are enclosed in a insulated vessel. To prevent the CC from overheating during extended periods of engine use, the insulated vessel has ports which may be opened to allow air to enter the insulated vessel and circulate around the CC and EP.

Electrical power for heating the CC and EP may be obtained from photovoltaic cells (PV), from the engine starter battery, from an additional battery, or from a alternating current (AC) source.

A phase change material (PCM) within the insulated vessel may be provided to store thermal energy thereby reducing heating requirements between engine uses.

A catalytic converter thermal control system (CCTCS), and the exhaust pipe temperature control system (EPTCS), or a system which combines both control functions, monitors the CC and EP temperature and activates the electrical or combustion heating system, opens and closes the ports of the insulated vessel, and activates fans on the ports depending on the temperature of the CC or the EP. The control systems may have a timer function that can be set by the driver to heat the CC or EP prior to a expected use of the vehicle. The systems may also have a recording system that can be used to monitor the drivers use of the vehicle and its emissions of pollutants.

The timer function can be used without a insulating vessel to heat the CC to a functional temperature just prior to a use of the vehicle. When the engine is started the CCTCS quickly heats the CC to optimal functional temperature.

The CCTCS and the EPTCS may start the engine when the charge on the batteries is low.

The insulated vessel described maintains the CC at a high temperature thus increasing the effectiveness of emission reduction systems that rapidly heat the catalytic converter at start up. The insulated vessel also increases the effectiveness of emission reduction systems that store pollutants until the CC reaches a functional temperature, such as zeolites.

The heating of the catalytic converter while it is within a insulated vessel eliminates catalytic converter overheating associated with rapid start up heating using electricity or fuel. The ability to open the insulated vessel and allow the free passage of air over the catalytic converter and exhaust pipe eliminates the problem of overheating of the catalytic converter during extended operation of the engine.

This invention maintains the catalytic converter at an elevated temperature when the engine is not operating. The insulated vessel may use vacuum insulation or conventional insulating materials such as glass wool, ceramics or aerogel. The insulating vessel has ports that are opened when the catalytic converter is at or above optimal operating temperature. When the ports are opened air can flow through the insulated vessel and around the catalytic converter preventing the catalytic converter from over heating during extended periods of engine operation. With the ports closed the catalytic converter's operating temperature is maintained by electrical heating or fuel combustion. Electrical power requirements for heating are reduced by enclosing the catalytic converter in an insulated vessel with controlled air flow. Phase change materials which store and release heat may also used to reduce electrical heating requirements.

BRIEF DESCRIPTION OF DRAWINGS

Embodiments of the invention may be described with reference to the following figures:

FIG. 1 Horizontal cross section of the insulating vessel and catalytic converter.

FIG. 2 Vertical cross section of the insulating vessel and catalytic converter.

FIG. 3 Frontal view of the insulating vessel.

FIG. 4 Insulating material configurations.

FIG. 5 Cross section of insulating vessel and catalytic converter.

FIG. 6 Side view of the insulating vessel showing open port flaps.

FIG. 7 Side view of the insulating vessel showing closed port flaps.

FIG. 8 Side view of insulating vessel showing fan and air scoop.

FIG. 9 Cross section of valves on the exhaust pipe showing open and closed positions of flaps.

FIG. 10 Diagram of temperature control of the CCTCS.

FIG. 11 Cross sectional view of the insulating vessel showing various locations of the PCM containers.

FIG. 12 Schematic diagram of a fuel heating system that passes combustion products into the exhaust pipe.

FIG. 13 Schematic diagram of a fuel heating system that passes combustion products into the insulated vessel, showing partially open port flaps.

FIG. 14 Schematic cross sectional view of a exhaust pipe temperature control system.

FIG. 15 Cross section of the insulating pipe and exhaust pipe.

DETAILED DESCRIPTION

The catalytic converter (2) may be of well known conventional construction such as the two-way converter (oxidization), or the three-way converter (oxidization and reduction) type. A three-way catalytic converter has air pumped into the catalytic converter. This airflow into the three-way catalytic converter reduces the emission of oxides of nitrogen (NOX). The catalyst (4), may be in pellet form, monolith form, or honey comb form. The wall of the catalytic converter (6) directs the flow of exhaust through the catalyst. An exhaust pipe (8), connects to the front and rear of the catalytic converter.

Surrounding the catalytic converter is a insulating vessel (10). The insulating vessels wall can be made several ways. The insulating vessel wall can be made using two sheets of metal (9) with insulating materials (12) sandwiched therebetween. Insulating materials are well known in the art and include refractory beads, refractory oxide fibers, refractory ceramic blocks, or refractory aerogel. Refractory fiber blankets can be used to insulate the catalytic converter. Refractory fiber blankets may be 40 percent silica, 40 percent to 60 percent alumina, with the remainder being other oxides. Cerawool Blanket provides service to temperatures of 750 C (1600 F), Cerablanket provides service to 1100 C (2400 F), and Cerachem and Cerachrome Blankets provide service to 1200 C (2600 F). The insulating vessels wall can be made of vacuum panels formed from two sheets of metal (9), with a vacuum (11), between the two metal sheets. Vacuum panels usually have a powder, microspheres, or a internal supporting framework that prevents atmospheric pressure from collapsing the vacuum panel. Layers of reflective materials reduce radiative heat transfer through evacuated spaces. The insulating vessel wall can be a single sheet of metal (9), with insulating ceramic materials (15), fixed to the inside.

Vacuum insulating panels (11), may be thin while providing a high thermal resistance barrier and are therefore preferred. In situations where there is limited clearance between the bottom of the vehicle and the ground, the thinnest insulating vessel possible is desirable. A heat shield (16) may be provided between the catalytic converter (2), and the auto body (14).

FIG. 2 shows an insulating vessel (10), using vacuum panels (17), to form the top and bottom of the insulating vessel, the sides of the insulating vessel are insulated using refractory ceramic bricks or foamed aerogel (19).

On the front and back of the insulated vessel (10), are airflow ports (18). Each port is blocked with a screen (7) that prevent particles from entering the insulated vessel. These screens do not unduly restrict airflow and are removable for cleaning the interior of the insulating vessel. Attached to the ports (18), are movable insulated flaps (21). When the engine is not running the flaps cover the ports (18), of the insulating vessel (10). With the insulated flaps (21), covering the ports (18), thermal energy is held within the insulating vessel, minimizing heat loss. When the catalytic converter is at optimal operating temperature and the engine is running, the flaps (21) move away from the insulating vessel (10), opening the ports (18). With the ports open, air can move through the insulated vessel (10), and around the catalytic converter (2), cooling the catalytic converter. When the vehicle is moving, air is rammed into the forward facing ports (20), increasing cooling of the catalytic converter. The flaps (21), may be joined by a linkage (23), so that all ports can all be opened and closed by one electric motor (24). The electric motor is controlled by the catalytic converter temperature control system (CCTCS). Many other flap, gate or door systems can be devised to open and close the ports on the insulating vessel providing control of air flow through the insulating vessel.

Fans (22), located on the insulating vessel may be provided and activated to force air through the insulating vessel (10), providing additional cooling of the catalytic converter. This forced air circulation generated by the fans is important when the engine is running but the vehicle is not moving, and the temperature of the catalytic converter approaches a maximum temperature. These fans may be a variable speed type that is controlled as a function of temperature. These variable speed fans allow greater control of catalytic converter temperature during various engine operating conditions. The fans are controlled by the CCTCS.

The insulated flaps (24) are located over the insulting vessel ports (18). A duct (20), can be connected to the front of the insulating vessel (10). This duct can be widened to create a scoop that rams air into the insulating vessel when the vehicle is moving. To reduce the entry of dirt and debris into the insulated vessel the duct (20), is elongated to move the opening of the duct under the hood of the vehicle. The fans (22), are located in the opening of the duct (20), removable screens or filters (7), are located in front of the fans. The fans are located outside the insulated enclosure and away from other hot vehicle components that could damage the fans.

The catalytic converter wall may be finned (26), externally and/or internally, to increase thermal energy transfer. The catalytic converter may be fabricated with air channels, or heat exchange tubes (29), passing through the catalytic converter wall and contained catalyst. These channels or tubes increase heat transfer from catalyst to air flowing through the insulated vessel. Catalyst can be applied directly to the exterior of the tubes (29). All air entering the insulated vessel can be passed through the tubes going through the catalytic converter. The controlled movement of air through the insulating vessel and the tubes going through the catalytic converter provides control of catalyst temperature under various engine operating conditions. The CCTCS monitors the catalytic converter temperature, and opens and closes the ports, and operates the fans, to (a) control catalytic converter temperature during operation, and (b) maintain the catalytic converter at a functional temperature between uses.

Valves (25) may be provided in the exhaust pipe in front of, and behind, the catalytic converter (2). These valves prevent convective heat flows within the exhaust pipe when the engine is not operating. The movement of air in the exhaust pipe can remove thermal energy from the catalytic converter and the insulating vessel. These valves are weighted hinged flaps that are pulled by gravity to a vertical position (27). In this vertical position the flaps block air movement through the exhaust pipe. When the engine is running the exhaust flow moves the flaps to a horizontal position (29). When the engine is turned off, the exhaust flow stops, and the flaps return to a vertical position. The return of the flaps to a vertical position can be assisted by springs, or by increasing the weight of the insulated flaps. To reduce thermal energy transfer through the valves (25), two valve flaps are placed on the exhaust pipe in front of, and behind, the catalytic converter (2). The air space between the two flaps acts as a insulating dead air space. To reduce thermal energy transfer the flaps may be made of thin vacuum panels or ceramic plates.

Within the insulated vessel (10), or catalytic converter (2), are electrical heating elements (28). The electrical heating elements may be powered by electricity from the engines starter battery (30), electricity stored in a additional battery (32), electricity from photovoltaic cells (34), or electricity from a AC electrical power source(36).

Rapid electrical heating of the catalytic converter at engine start up has been proposed in other patents. The high energy output associated with rapid electrical heating of the catalytic converter can overheat and permanently damage the catalytic converter. These rapid electrical heating systems can be used to provide a continual heating of the catalytic converter inside the insulating vessel proposed here. The CCTCS maintains the catalytic converters temperature between uses by decreasing the power supplied to the heating elements of the rapid electrical heating system. At start up the CCTCS provides a higher power output to rapidly heat the catalytic converter to optimal operating temperature from a functional but lower temperature. The possibility of damaging the catalytic converter by rapid heating at start up is reduced due to the small amount of energy required to raise the catalytic converter from a functional temperature to optimal functioning temperature. Rapid electrical heating systems proposed in other patents combine the heating element and the catalyst into one element to heat the catalyst by conduction. Similar combined heating element and catalyst systems can be used to maintain the temperature of a catalytic converter in a insulating vessel, between vehicle uses.

Photovoltaic cells (34), on the vehicle provide electrical power to electrical heating elements that heat the catalytic converter. Photovoltaic cells convert light to electricity. Photovoltaic cells can provide electrical power to heat the catalytic converter only during daylight hours when they are exposed to sunlight. Power from the photovoltaic cells can also be used to charge the engines starter battery, or a additional battery carried by the vehicle. The power supplied by photovoltaic cells depends on the availability of sunlight. A vehicles used in northern areas would have limited photovoltaic power produced during the winter. Vehicles parked inside would obtain limited heating of the catalytic converter from photovoltaic cells. The photovoltaic cells can be placed on multiple surfaces of the vehicle in multiple orientations, in this manner some photovoltaic cells will be exposed to direct sunlight when the vehicle is outside on a sunny day. If the driver knows the vehicle will be parked a particular direction during the day then PV cells are placed on the side of the vehicle exposed to the sun. PV cells placed horizontally on the roof of the car will produce the most power at noon. PV cells placed vertically, or standing up, on the roof of the car are placed in a front to back orientation to reduce drag when the vehicle is in motion. Vertically placed PV cells would produce the most power early and late in the day.

PV cells can be used to effectively heat the catalytic converter if the insulated vessel has a high thermal resistance, and therefore little heating or electrical power is required to maintain the catalytic converter at a functional temperature.

A additional battery carried by the vehicle can provide electricity to heat the catalytic converter. With a additional battery the engines starter battery is used to heat the catalytic converter when the additional battery has been substantially discharged. When the engines starter battery is used to heat the catalytic converter, the starter batteries charge is monitored, to insure the starter battery maintains sufficient charge to start the engine when required. The charge of the additional battery is monitored to reduce deep discharge events which may reduce the life span of the battery.

In one embodiment, the catalytic converter can be heated by plugging the vehicle into a alternating current (AC) power source. An AC heating element can be placed within the insulated vessel, or catalytic converter, or the AC power can be transformed to direct current (DC) using a transformer (3), to provide power to DC heating elements within the insulated vessel, or catalytic converter. Using AC heating elements would require that DC heating elements also be carried in the insulated vessel, or catalytic converter, for use when the no AC power source was available. Transforming the AC power to DC, and using DC heating elements to heat the insulated vessel, or catalytic converter, would eliminate the need for AC heating elements. The CCTCS controls the power supplied to the heating elements. The AC power supply can also be used to maintain the electrical charge of the vehicles starter battery, or a additional battery, or to power a engine block heater, or vehicle interior heater, or a battery heater.

In one embodiment, the insulating vessel (10), may be provided with containers of a phase change material (26). The phase change material (PCM) changes from a solid to liquid at a temperature below the optimal operating temperature of the catalytic converter, but above the minimum desired functional temperature of the catalytic converter. When a phase change material changes from a liquid to a solid thermal energy is released. This thermal energy release maintains the catalytic converter at a high temperature well after the engine has been turned off. The energy released by the phase change material reduces the energy required to heat the catalytic converter between engine uses. The phase change material stores thermal energy when the engine is running and releases the thermal energy when the engine is not running. The PCM should not be flammable, toxic or expensive, and should have a high latent heat of fusion.

The phase change material (PCM) changes from a solid to a liquid phase at a temperature below the temperature at which the catalytic converter operates at optimal efficiency. The temperature selected for the melting point of the phase change material is a temperature at which the catalytic converter has a high level of functional efficiency, but not optimal efficiency. When the temperature of the catalytic converter has dropped below the PCM melting point electrical heating is activated. Electrical heating maintains the catalytic converter at a temperature at which the catalytic converter has a high level of functional efficiency, but not optimal efficiency. The lower the temperature that the PCM melts at, and the lower the temperature maintained by electrical heating, the less energy is required to heat the catalytic converter between engine uses. With the catalytic converter at a high functional efficiency little pollutants are produced before the catalytic converter reaches optimal efficiency. This is due to the catalytic converter being at a functional temperature at start up. When the catalyst is at a functional temperature, it breaks down hydrocarbons, generating heat that increases the catalytic converters temperature.

Suitable phase change materials may include metals, metal alloys, metal salt hydrates or a hydride of trimethylol ethane or other polyhydric alcohols.

The phase change material (PCM) container (26), can be placed within the insulated vessel (10), in several locations. The PCM container can be located on the wall of the catalytic converter (40), with a air space between the PCM container and the insulating vessel (10). The PCM container can be on the wall of the insulated vessel (42), with a air space between the catalytic converter (2), and the PCM container (42). The PCM container (44), can be on the exhaust pipe (8), behind the catalytic converter (2), in a elongated insulating vessel (10). The PCM container (46), can be in front of the catalytic converter (2), in a elongated insulated vessel (10). The phase change material containers (47), can be located within the catalytic converter.

PCM containers that are positioned away from the exhaust pipe, or the catalytic converter, and on the interior wall of the insulated vessel, are cooled by air flowing through the insulated vessel. The PCM containers positioned in this manner are not heated to high temperatures. When the PCM containers are positioned against the exhaust pipe, or catalytic converter they are heated to higher temperatures. The surfaces of PCM containers that are exposed to air flowing through the insulated vessel, may be insulated to reduce heat loss and increase their temperature.

In one embodiment, the electrical heating of the catalytic converter may be controlled by the catalytic converter temperature control system (CCTCS). The CCTCS monitors the temperature of temperature sensors (38), within the catalytic converter (2), and/or insulating vessel (10). If the temperature falls below a minimum temperature the heating systems are activated. The CCTCS opens the ports on the insulating vessel when the engine is running and the catalytic converter is at optimal operating temperature. The CCTCS closes the ports on the insulating vessel when the engine is turned off. The CCTCS closes the ports when the engine is running and the catalytic converters temperature is below a desired temperature. When the optimal operating temperature of the catalytic converter is exceeded, the CCTCS turns on fans (22), to provide additional cooling of the catalytic converter. The CCTCS informs the driver when the catalytic converter is near a temperature that could damage the catalytic converter. The driver can then alter the use of the vehicle to reduce the temperature of the catalytic converter. The CCTCS may maintain a record of any incident that could have resulted in damage to the catalytic converter.

The CCTCS has a timer function that can be set by the driver to heat the catalytic converter to operating temperature just prior to a expected use of the vehicle. The insulated vessel, or catalytic converter is not heated, until just prior to the expected use of the vehicle. The timer function may reduce the energy required to heat the catalytic converter between engine uses.

The CCTCS timer function can be used by catalytic converter electrical heating systems not having a insulated vessel. A catalytic converter electrical heating system operated over a several minute period at a low power level heats the catalytic converter to a functional temperature. This long low power heating phase allows conduction and convection within the catalytic converter, heating the catalyst evenly. The low power heating phase is followed by a high power heating phase after the engine is started. The high power phase heats the catalytic converter from a functional temperature to optimal temperature. With the catalytic converter heated to a functional temperature less energy and time is required to heat the catalytic converter to optimal functional temperature. The reduction in the high energy input to the catalytic converter at start up reduces the possibility of the damaging the catalytic converter.

The driver can turn off the CCTCS if the vehicle will not be used for a extended period. When the driver wishes to use the vehicle the driver can activate the CCTCS to heat the catalytic converter to a functional or operation temperature over a short period of time prior to the vehicle being started. The driver can choose to wait before for the catalytic converter to reach a functional temperature before starting the engine. This allows the driver to have control over minimizing engine emissions.

The CCTCS may have a monitoring and recording function that informs the driver, mechanic, automobile manufacturer, or governmental body regarding how the CCTCS system is being used by the driver. If the driver is not using the CCTCS system to reduce emissions of pollutants at vehicle start up, the driver can alter their usage of the vehicle.

If the photovoltaic cells are providing power and the batteries are fully charged, the catalytic converter is heated, even if the timer, as set by the driver, indicates that the vehicle is not going to be used. If the driver decides to use the vehicle earlier than initially thought, the catalytic converter is at operating temperature.

If photovoltaic cells are producing power and the vehicle batteries are fully charged, the power from the photovoltaic cells is used to heat the catalytic converter to a maximum temperature.

Power from photovoltaic cells can be used to heat the catalytic converter to temperatures above optimal operating temperature. The thermal energy stored by slightly overheating the catalytic converter, is used to maintain the catalytic converter at a functional operating temperature when the photovoltaic cells are not producing power. The melting of the phase change material serves to store energy from the photovoltaic cells.

Some of the catalysts used to break down nitrogen oxides function at high temperatures and only in a narrow temperature range. In these cases the temperature that the insulated vessel is maintained at may be below the functional temperature of the catalyst. The higher temperature of the catalyst at start up still reduces the time required for the catalyst to reach functional and optimal performance temperatures. Maintaining the catalytic converter at a lower temperature than the catalyst functions at reduces the amount of energy required to maintain the catalytic converter's temperature.

If the CCTCS is plugged into a alternating current (AC) power supply the engines catalytic converter can be maintained at a optimal temperature for start up. With the CCTCS timer function the catalytic converter can be allowed to cool between uses, with the catalytic converter heated to a optimal functional temperature just prior to the drivers use of the vehicle.

With the CCTCS timer function the catalytic converter can be maintained at a low temperature during one time interval, when vehicle use is very unlikely. The catalytic converter is then heated to the optimal functional temperature just prior to a expected vehicle use. The ability to maintain varied temperatures during time intervals before a expected vehicle use reduces the energy required to maintain the catalytic converters temperature, while providing a catalytic converter at functional temperature if the driver decided to use the vehicle earlier than expected.

The catalytic converter can be heated according to a recorded vehicle use pattern by a recording and memory system. For example, if the driver goes to work at 8 am from Monday to Friday the recording system could note this pattern, and heat the catalytic converter for a vehicle use at 8 am from Monday to Friday. If the vehicle is never used between 11:30 pm and 7:00 am the catalytic converter is allowed to cool during this time period to reduce energy use. Alternatively, the driver can program a pattern of vehicle use into the CCTCS, in a manner similar to the timer function of a video cassette recording system.

The CCTCS can electrically heat the catalytic converter when the engine is operating should the temperature of the catalytic converter fall below optimal functioning temperatures. The CCTCS can move the insulating flaps to close the ports on the insulating vessel and increase the catalytic converters temperature during engine operation. Maintaining the catalytic converter temperature during engine operation is important when engines have a mode of operation which does not use all engine cylinders. However, in most cases the exhaust stream from the engine is hot enough to maintain the catalytic converter at optimal operating temperature.

Enclosing the catalytic converter in a insulating vessel and maintaining it at a functional temperature enhances the performance of systems that rapidly heat the catalytic converter at start up. Systems that increase the fuel air ratio during start up provide enhanced performance when the catalytic converter is maintained at a functional temperature. Less fuel is required to heat the catalytic converter to optimal operating temperature from a functional temperature, and the possibility of over heating the catalytic converter is reduced. Systems that use electrical heating elements to rapidly heat the catalytic converter at start up provide enhanced performance when the catalytic converter is maintained at a functional temperature. Systems that store pollutants, such as a zeolite system, have to store less pollutant after start up, before a catalytic converter maintained at a functional temperature reaches optimal functional temperature.

The present invention may be adapted to existing vehicles with little modification to the existing exhaust system. The vehicles catalytic converter can be removed from the exhaust pipe and temperature sensors, PCM containers, and electrical heating elements attached to the catalytic converter. The assembly is placed into a insulated vessel. The exhaust pipe is connected to the front and back of the insulated vessel and the insulated vessel is attached to the automobile.

As an alternative to electrical heating elements, a fuel burner can be used to put hot combustion gases directly into the exhaust pipe, catalytic converter, or insulated vessel. If the catalytic converter is in a insulated vessel the amount of fuel required to maintain the catalytic converter at a functional temperature is reduced.

Fuel burning systems have a pump (50), that pumps air into a burner (52). The burner has a ignition plug (54), that ignites the fuel (56), that is pumped (58), into the burner (52). A catalyst may be located within the burner to assist combustion. The burner can be outside or inside the insulated vessel. Like an external burner (52), an internal burner (74) is supplied with fuel (70) by means of a pump (72). The combustion products can enter the insulating vessel, catalytic converter, or exhaust pipe. If the burner is located inside the insulated vessel, or the combustion products from a burner outside the insulated vessel enter the insulated vessel, the ports on the insulating vessel are partially opened to allow the combustion products from the burner to enter and leave the insulating vessel. If the hot combustion products enter the exhaust pipe (8) via a conduit (60), they pass through the catalytic converter (2), before leaving the exhaust pipe. With an insulated vessel (10), surrounding the catalytic converter less fuel is burned to keep the catalytic converter at a functional temperature.

Fuel combustion is used to heat the catalytic converter when electrical power is not available. The CCTCS operates the fuel burning and electrical heating systems. The fuel burning system is a option for drivers that can not plug their vehicle into a power outlet. A fuel burning system would have to be deactivated when the vehicle was parked in a enclosed area. Automatic detection systems on the vehicle could detect the ceiling when a vehicle is parked inside. These detection systems could use ultrasound, radar or laser beams to detect the ceiling directly above the vehicle. The CCTCS would inform the driver the fuel heating system would be deactivated, the driver can over ride the deactivation system if the vehicle is parked in a covered but not enclosed area. The driver can manually switch off the fuel burning system when the vehicle is parked inside.

The use of a fuel burning systems to heat the catalytic converter would be limited to situations where sufficient electrical power could not be stored by vehicle batteries, and the vehicle could not be plugged into a AC power source. The fuel burning system would be considered rarely due to the emission of combustion products, and the additional mechanical components required to accomplish heating of the catalytic converter by burning fuel rather than using electricity.

The engine itself can be used as a fuel burning system. In this concept the CCTCS detects that the catalytic converter is at the minimum temperature desired, that the PCM has solidified, and that the batteries charge is low. The CCTCS then starts the engine to reheat the catalytic converter, melt the PCM and charge the batteries. The engine starting system is switched off by manual, or automatic, systems when the vehicle is parked inside. When the engine is started by the CCTCS the engine emits little pollutant as the catalytic converter is at a functional temperature. Cold engine starting systems, that start the engine when the engine, or engine coolant, drops below a certain temperature are common in cold climate areas. In this concept, the CCTCS starts the engine to maintain the catalytic converter at or close to a functional temperature. The insulated vessel surrounding the catalytic converter reduces heat losses from the catalytic converter, reducing the frequency that the CCTCS starts the engine. This cold catalytic converter starting system, operated by the CCTCS when the vehicle is parked outside, combined with plugging the CCTCS into a AC power outlet when the vehicle is parked inside would reduce engine emissions considerably. The CCTCS system can include a start up radio transmission system. The driver activates a radio transmission that starts the vehicle engine to warm the engine for a expected vehicle use.

The principles described above for controlling the temperature of the catalytic converter can be applied to the exhaust pipe (80), between the engines exhaust manifold (82), and the catalytic converter (2). These principles for controlling the temperature of the catalytic converter being a insulated vessel, with air flow ports that can be opened and closed, fans to move air through the insulated vessel, phase change materials to store energy, electrical heating elements, or fuel heating systems, to heat the catalytic converter, and a temperature control system. Maintaining the exhaust pipe at a high temperature means that exhaust gases leaving the engine (82) at start up, do not heat the exhaust pipe, and that hot exhaust gases arrive at the catalytic converter.

When the engine is started the exhaust gases leaving the engine are at a low temperature, and the exhaust pipe is at ambient temperature. The low temperature exhaust gases leaving the engine are further cooled as they heat the exhaust pipe. If the exhaust pipe is hot when the engine is started the exhaust gases reach the catalytic converter at a much higher temperature. It is possible for a catalytic converter maintained at a functional temperature within a insulated vessel, to be cooled below a functional temperature, at start up, by cold exhaust. The cooling of the catalytic converter to a temperature lower than that at which the catalyst functions leads to the emission of higher levels of pollutants.

Therefore, in an alternative embodiment, a double walled insulated pipe (84) surrounds the exhaust pipe (80). The wall of the insulating pipe (84) can be made using refractory ceramic blocks, refractory ceramic beads, refractory insulating fiber blankets, vacuum insulating panels, or a combination of these insulating materials. To create a flexible insulating pipe (84), the walls of the insulated pipe are formed from corrugated stainless steel tubes and refractory insulating fiber blankets, or refractory ceramic beads are used for insulation. Sections of the insulating pipe can be rigid while other sections are flexible. A flexible insulated pipe can be slid over a existing exhaust pipe. Between the exhaust pipe (80), and the insulating pipe (84), is a air space (88). The insulating pipe is held in position around the exhaust pipe by supports.

At the top and bottom of the insulated pipe (84), are insulated collars (90), that are clamped onto the exhaust pipe (80), so that a air tight seal is formed. These collars (90), have a air channel (91), within them that is continuous with the air space (88), around the exhaust pipe. On the collars (90), are ports (94), that can be covered or uncovered by movable insulating flaps (96). These insulating flaps are opened and closed by electrical motors (98), and associated mechanical linkages (100). The insulating flaps are closed when the engine is not running containing thermal energy within the insulated pipe (84). The insulating flaps open when the exhaust pipe is at a desired temperature and the engine is running. The insulated flaps on the collars open forward so that they functions as air scoops (101). This air scoop effect rams air into the insulating pipe (84), when the vehicle is moving. Removable screens or filters (99), prevent dirt and debris from entering the insulating pipe (84). A fan (102), located in the port (94), or duct leading to the port, increases air flow through the insulating pipe when the exhaust pipe exceeds a desired temperature. The ability to cool the exhaust pipe prevents very hot exhaust gases from overheating the catalytic converter. The fans are located outside the insulated pipe, where they are protected from high temperatures.

Valves (103), in the exhaust pipe, similar to those used by the catalytic converter heating system, are located in the collars (90). These valves prevent air movements in the exhaust pipe, reducing convective heat transfer, and heat losses through the exhaust pipe (80).

The exhaust pipe is heated by electrical heating elements (104), that are powered using electrical power from PV cells, the engine starter battery, a additional battery, or a alternating current power source. The electrical heating elements (104), are located in the lower part of the exhaust system near the catalytic converter. The electrical heating elements can be located within the exhaust pipe, or within the insulating pipe. The temperature in the exhaust pipe is detected by temperature sensors (106), within the insulated pipe, or exhaust pipe. The temperature sensors provide information to the exhaust pipe temperature control system (EPTCS). The EPTCS controls the heating systems.

The exhaust pipe may also be heated by fuel combustion. A burner (108), similar to the described for the catalytic converter has air and fuel pumped into it and the hot combustion products leaves the burner (108) and enter the exhaust pipe or insulating pipe. The insulated flap (96), on the lower collar (90), opens when combustion products from the burner enter the insulating pipe (84). If burner combustion products enter the exhaust pipe they pass through the catalytic converter before leaving the exhaust pipe. The EPTCS can also start the engine when the exhaust pipe is at minimum temperature, the PCM has solidified and the charge on batteries is low. This cold exhaust pipe engine starting system would be similar to the cold catalytic converter engine starting system.

Phase change material containers (110), are placed within the exhaust pipe (80), or the insulating pipe (84). The phase change material (PCM) releases thermal energy as the PCM solidifies. This thermal energy release reduces the amount of electrical energy or fuel, required to heat the exhaust pipe between engine uses. Placing the phase change material containers in the exhaust pipe requires that the diameter of the exhaust pipe be increased, to prevent the flow of exhaust through the exhaust pipe from being restricted. If the PCM containers (110), are located within the insulating pipe (84), modification of the exhaust pipe is not required. The PCM containers (110), can be located on the wall of the exhaust pipe, with an air gap between the PCM container and the insulating vessel. The PCM container can be located on wall of the insulating pipe, with a air gap between the PCM container and the exhaust pipe. When the PCM containers are against the exhaust pipe, or within the exhaust pipe, they are heated to higher temperatures than if they are on the wall of the insulated pipe. Air flowing through the insulated pipe cools the PCM containers within the insulated pipe. The surface of the PCM container exposed to air flowing through the insulated pipe can be insulated to reduce heat losses.

Placing electrical or fuel heating systems, phase change material containers and temperature sensors in the exhaust pipe may require holes to be made in the wall of the exhaust pipe. These holes must be sealed to prevent engine exhaust from leaving the exhaust pipe. These holes represent areas where breakdown of the exhaust pipe can begin. For these reasons it is preferred to locate components for maintaining the temperature of the exhaust pipe within the insulating pipe and outside the exhaust pipe. If components are located in the insulating pipe the assembly can be slid over a existing exhaust pipe. PCM containers, electrical heating elements, and temperature sensors can be attached to the exhaust pipe and a flexible insulated pipe slid over the components and exhaust pipe.

The opening and closing of the flaps, operation of fans, electrical heating system, or fuel combustion heating systems are controlled by the exhaust pipe temperature control system (EPTCS). The EPTCS receives information from temperature sensors within the exhaust pipe, or insulating pipe. When the engine is not running the EPTCS closes the flaps (96), to prevent air flows from removing thermal energy from the insulating pipe. When the temperature of the exhaust pipe falls below a desired temperature the electrical heating or fuel combustion heating systems are activated. When the engine is running and the temperature of the exhaust pipe, or interior of the insulating pipe is above a desired temperature the insulating flaps (96) on the collars (90), open to allow air flow around the exhaust pipe (80), within the insulating pipe (84). If the temperature of the exhaust pipe, or interior of the insulating pipe rises above a desired temperature, fans (102) are activated to increase the air flow through the insulating pipe to cool the exhaust pipe, and thereby cool exhaust flowing through the exhaust pipe.

The fans may have a variable speed that increases in relation to a increased temperature of the exhaust pipe. These variable speed fans provide control of the temperature of the exhaust pipe, and thereby provide control of the temperature of exhaust entering the catalytic converter, providing further control of the temperature of the catalytic converter.

In one embodiment, the exhaust pipe may be finned (112) internally and/or externally to increase the heat exchange between engine exhaust within the exhaust pipe, and air within the insulating pipe. Tubing's can be put through the exhaust pipe so that a heat exchanger is developed between the exhaust pipe and air flowing through the insulating pipe. Such heat exchanger systems increase control of the temperature of exhaust entering the catalytic converter, and thereby provides control of the temperature of the catalyst within the catalytic converter.

Photovoltaic cell power, and AC power, can be used to heat the exhaust pipe and PCM containers contained within the insulating pipe to a high temperature prior to vehicle use. The exhaust pipe cannot be damaged by high temperatures as the catalytic converter may be. At start up the cool exhaust leaving the engine is heated as it passes through the exhaust pipe. The hot exhaust leaving the exhaust pipe and entering the catalytic converter rapidly heats the catalytic converter to a functional and optimal operating temperature. Such a high temperature exhaust pipe heating systems could be used without having a insulated vessel surrounding a catalytic converter.

The EPTCS can be place on existing vehicles without modifying the existing exhaust system. Components such as PCM containers, electrical heating elements and temperature sensors can be attached to a exhaust pipe and a flexible insulating pipe slid over the components.

CCTCS and EPTCS Combined Systems

Both the exhaust pipe temperature control system (EPTCS) and the catalytic converter temperature control system (CCTCS) need not be used on a engine. For a specific engine, or vehicle design one system may be preferred. For optimal catalytic converter temperature control both a EPTCS and CCTCS may be used. Optimal catalytic converter temperature control reduces the emissions of pollutants to a minimum.

The EPTCS and the CCTCS function together to maintain the catalytic converter at a functional temperature between engine uses prevent over heating of the catalytic converter during extended engine operation prevent exhaust from cooling the catalytic converter below a functional temperature at start up provide a catalytic converter at functional temperature at start up, and regulate the temperature of the catalytic converter during engine operation to maintain a optimum temperature for the breakdown of engine pollutant emissions keep the catalytic converter above a minimum temperature during engine operation keep the catalytic converter below a maximum temperature during engine operation With both a CCTCS and a EPTCS on a engine the air space within the insulating vessel and the insulating pipe can be continuous. The number of flaps and the associated mechanical components, heating elements, phase change material containers, temperature sensors, and other components that are similar in the two systems may be reduced.

A timer function can be set by the driver to activate the CCTCS the EPTCS to heat the catalytic converter and exhaust pipe prior to a expected use of the vehicle.

When the vehicle is parked outside the CCTCS and the EPTCS use electrical heating systems to heat the catalytic converter until the charge on batteries is low. The CCTCS and the EPTCS then use the cold catalytic converter engine starting system to start the engine. When the engine is running, fuel combustion heats the catalytic converter, melts the PCM and recharges the batteries. When the vehicle is parked inside, it is plugged into an AC power source and the CCTCS and EPTCS use electrical heating systems to heat the catalytic converter. The use of a CCTCS and EPTCS may reduce engine emissions by over 60 percent.

What is claimed is:

1. An exhaust assembly for an internal combustion engine comprising:
    (a) a catalytic converter having an exterior surface, and inlet and outlet, where the inlet is connected to an exhaust pipe from the engine;
    (b) an insulating vessel surrounding the catalytic converter, said vessel defining at least one air intake port and at least one air outlet port;
    (c) means for opening and closing the intake and outlet ports;
    (d) control means for controlling the means for opening and closing of the intake and outlet ports;
    (e) means for heating the catalytic converter,
    (f) control means for controlling the means for heating the catalytic converter.

2. The exhaust assembly of claim 1 wherein the heating means comprises an electrical heating element disposed within the insulating vessel.

3. The exhaust assembly of claim 2 wherein the electric heating element derives electrical power from a battery.

4. The exhaust assembly of claimed 3 further comprising photovoltaic cells for recharging the battery.

5. The exhaust assembly in claimed 3 where the control means starts the vehicles engine when batteries charge is low.

6. The exhaust assembly of claim 2 further comprising an alternating current to direct current transformer for recharging the battery from an alternating current electrical power source.

7. The exhaust assembly of claimed 2 wherein the electrical heating element derives electrical power from an alternating current electrical source.

8. The exhaust assembly of claim 1 wherein the heating means comprises a burner having a fuel source, an air source and heat conduit for transferring heat into the insulating vessel or the catalytic converter.

9. The exhaust assembly of claim 1 further comprising a fan controlled by the control means and associated with at least one port of the insulating vessel for moving outside air into the insulated vessel and around the catalytic converter.

10. the exhaust assembly of claimed 9 wherein said fan is a variable speed fan and the control means controls the speed of the fan.

11. The exhaust assembly of claim 1 further comprising a heat storage element disposed within the insulating vessel.

12. The exhaust assembly of 11 wherein the heat storage element comprises a phase change material.

13. The exhaust assembly in claim 1 where the control system starts the vehicles engine when the temperature of the catalytic converter, or exhaust system component drops below a desired temperature and turns the vehicles engine off when the temperature of the catalytic converter, or exhaust system component is above a desired temperature.

14. The exhaust assembly in claim 1 further comprising a insulated sleeve which surrounds and is spaced apart from the incoming exhaust pipe wherein, said heating means also heats the incoming exhaust pipe wherein the intake port and outlet port are located on the insulting vessel surrounding the catalytic convert or the insulting sleeve surrounding the exhaust pipe.

15. A control system for heating a catalytic converter comprising:
    (a) a heating means for heat the catalytic converter of a internal combustion engine, and
    (b) a clock for determining time, and
    (c) a switch for turning on and off said catalytic converter heating means, and
    (d) a control means for controlling said on and off switch according to the time determined from said clock, and
    (e) a input means for the internal combustion engine operator to input a time of intended internal combustion engine use into said control means, whereby said control means activates said catalytic converter heating means prior to the time the operator intends to use the internal combustion engine.

16. The system of claim 15 further comprising
    (a) memory means for recording times when the operator users the internal combustion engine
    (b) prediction means that predicts the next time the operator will use the internal combustion engine by using the memory means recordings of the times the operator uses the internal combustion engine
    (c) a control means for activating said on and off switch for turning on and off said catalytic converter heating means
    (d) a input means for said prediction means to input the next predicted time of internal combustion engine use into said control means, whereby, said control means activates said catalytic converter heating means prior to the predicted time of internal combustion use.

17. An exhaust assembly for an internal combustion engine comprising:
    (a) en exhaust pipe leading from the engine;
    (b) and insulting vessels surrounding the exhaust pipe, upstream from the catalytic converter, said vessels defining at least one air intake port and at least one air outlet port;
    (c) means for opening and closing the intake and outlet ports;
    (d) control means for controlling the means for opening and closing the intake and outlet ports
    (e) means for heating the exhaust pipe,
    (f) control means for controlling the means for heating the exhaust pipe.

18. The exhaust assembly of claim 17 further comprising heat storage means disposed within the insulating vessel.

19. The exhaust assembly of claim 17 wherein said heating means heating comprises an electrical heating element.

20. The exhaust assembly of claim 18 wherein said heat storage means comprises an phase change material.

21. the exhaust assembly of claim 17 wherein the heating means comprises a burner having a fuel source, an air source and a heat conduit for transferring heat into the insulted vessel.

22. An exhaust assembly for a internal combustion engine comprising:
    (a) a catalytic converter having a exterior surface, an inlet and an outlet wherein the inlet its connected to an exhaust pipe from the engine;

(b) an insulting vessel surrounding the catalytic converter said vessel defining at least one air intake port and at least one air outlet port;

(c) means for opening and closing the air intake and outlet ports;

(d) control means for controlling the means for opening end closing the air intake and outlet ports;

(e) means for storing thermal energy when the engine is running and releasing thermal energy when the engine is turned off thereby maintaining the catalytic converters temperature when the engine is turned off.

23. The exhaust assembly in claim 22 where the means for storing thermal energy is a phase change material.

24. An exhaust assembly for an internal combustion engine comprising;

(a) an exhaust pipe leading from the engine;

(b) an insulting vessel surrounding the exhaust pipe, upstream from the catalytic converter, said vessel defining at least one air intake port and at least one air outlet port;

(c) means for opening and closing the intake and outlet ports;

(d) control means for controlling the means for opening and closing of the intake and outlet ports;

(e) means for storing thermal energy when the engine is running and releasing thermal energy when the engine is turned off thereby maintaining the exhaust pipe temperature when the engine is turned off.

25. The exhaust assembly in claim 24 where the means for storing thermal energy is a phase change material.

26. A exhaust assembly for a internal combustion engine comprising:

a. a exhaust pipe leading from the engine, and b. a catalytic converter having a exterior surface, and inlet and an outlet, wherein the inlet is connected to an exhaust pipe from the engine, and c. a vessel containing a phase change material for storing thermal energy when the engine is running and releasing thermal energy when the engine is turned off, thereby maintaining the catalytic converters temperature when the engine is turned off, and d. a electrical resistance heating element for heating the catalytic converter, and e. a control means for activating the electrical resistance heating element.

27. The exhaust assembly in claim 26 further comprising insulating vessel surrounding the catalytic converter.

* * * * *